United States Patent [19]
Osaragi

[11] Patent Number: 5,196,693
[45] Date of Patent: Mar. 23, 1993

[54] METHOD AND APPARATUS OF PHOTODETECTION WITH MAXIMUM SIGNAL HOLDING MEANS

[75] Inventor: Kazuki Osaragi, Tama, Japan

[73] Assignee: Kabushiki Kaisha Topcon, Japan

[21] Appl. No.: 631,716

[22] Filed: Dec. 20, 1990

[30] Foreign Application Priority Data

Dec. 20, 1989 [JP] Japan .................................. 1-329937

[51] Int. Cl.$^5$ ............................................ H01J 40/14
[52] U.S. Cl. ................................ 250/214 B; 356/400
[58] Field of Search ......... 250/214 R, 214 AL, 214 B, 250/208.2, 208.3, 208.4, 210, 574; 356/222, 147, 148, 150, 400

[56] References Cited

U.S. PATENT DOCUMENTS

| | | |
|---|---|---|
| 3,644,740 | 2/1972 | Dobratz et al. |
| 4,035,084 | 7/1977 | Ramsay ............................... 356/400 |
| 4,672,189 | 6/1987 | Tsunekawa et al. ............ 250/214 B |
| 4,676,634 | 6/1987 | Petersen . |
| 4,736,097 | 4/1988 | Philipp ........................... 250/214 B |

FOREIGN PATENT DOCUMENTS

| | | |
|---|---|---|
| 0055027 | 6/1982 | European Pat. Off. . |
| 61-50017 | 3/1986 | Japan . |

OTHER PUBLICATIONS

Dillard et al., "Radar Automatic Detection", *Microwave Journal*, vol. 28, No. 6, Jun., 1985, pp. 120–130.

*Primary Examiner*—David C. Nelms
*Attorney, Agent, or Firm*—Mason, Fenwick & Lawrence

[57] ABSTRACT

A photodetection method and apparatus a sampling time period selected for detection and processing of the output signals from light receiving means such that it is sufficiently larger than the pulse width $P_S$ of a normal output signal $I_{sc}$ but very smaller than the pulse width $P_A$ of a noise signal $I_{AC}$. During each of such sampling time periods, it is judged whether an output signal from the light receiving means is "present" or "absent". If the row of results obtained by at least three successive sampling periods is "0-1-0", it will be judged that the output signal generated during a sampling time period in which the output signal from the light receiving means is "present" is a normal output signal $I_{SC}$. If output signals are "present" during two of at least three sampling time periods as shown by "0-1-1", "1-1-1", "1-1-0" or "1-0-1", it will be judged that these output signals are due to any disturbance rays. The noise signals will not be taken for the subsequent signal processing procedure. In such a manner, the photodetection method and apparatus can eliminate any affection due to disturbance rays.

4 Claims, 5 Drawing Sheets

| ADDRESS | $2^7$ | $2^6$ | $2^5$ | $2^4$ | $2^3$ | $2^2$ | $2^1$ | $2^0$ |
|---|---|---|---|---|---|---|---|---|
| 101 | 0 | 0 | 0 | 0 | 0 | 0 | 0 | 0 |
| 102 | 0 | 0 | 0 | 0 | 0 | 0 | 0 | 0 |
| 103 | 0 | 0 | 0 | 0 | 0 | 0 | 1 | 0 |
| 201 | 0 | 0 | 1 | 0 | 0 | 1 | 0 | 1 |
| 202 | 0 | 0 | 0 | 1 | 0 | 1 | 1 | 1 |

METHOD AND APPARATUS OF PHOTODETECTION WITH MAXIMUM SIGNAL HOLDING MEANS

BACKGROUND OF THE INVENTION

1. Field of the Invention

The present invention relates to a method and apparatus of optically detecting a beam of light such as laser beam and the like. More particularly, the present invention concerns a photodetection apparatus suitable for use in such a rotating laser system as known in the fields of survey, construction and civil engineering and a method of photodetection therein.

2. Description of the Related Art

Photodetection techniques for measuring the intensity of light, the position of projected light and others have been broadly utilized in various fields.

FIG. 5 shows an example of rotating laser systems for performing the leveling in the survey, construction and civil engineering. Such a rotating laser system comprises a laser beam projecting device 2 and a photodetection device 1 for receiving the laser beam from the laser beam projecting device 2.

The laser beam projecting device 2 emits a laser beam L turned about a vertical axis 0 to define a reference plane P. The photodetection device 1 is positioned on a vertical stationary plane such as wall or pile and comprises at least first and second light receiving elements 11 and 12.

If the laser beam L from the laser beam projecting device 2 is projected only onto the upper light receiving element 11, this means that a reference mark 5 in the photodetection device 1 is positioned below the reference plane P defined by the laser beam L. This position of the laser beam causes "upward direction" indicators 3b and 4b to light on. Each of these indicators 3b and 4b has an upward arrow indicating the necessary upward movement of the photodetection device 1. On the contrary, if the laser beam is projected only onto the lower-light receiving element 12, this means that the reference mark 5 in the photodetection device 12 is positioned above the reference plane L. As a result, it causes "downward direction" indicators 3a and 4a each having an downward arrow to light on. The necessary downward movement of the photodetection device 1 is thus indicated. In addition, if the laser beam L is equally projected on both the upper and lower light receiving elements 11 and 12, it causes "center" indicators 3c and 4c to light on. This informs an operator that the reference mark 5 in the photodetection device 1 is brought into alignment with the reference plane P. The operator can obtain a leveling mark by drawing a line le on the wall or pile at the position of the reference mark 5.

Since the rotating laser device is frequently used out in the fields, the light receiving elements 11 and 12 will also receive disturbance rays as the sun's rays in addition to the laser beam L from the laser beam projecting device 2 which is used for measurement. When the sun's rays enter the light receiving elements 11 and 12, these elements will generate an output signal $I_O$ which includes normal signals $I_S$ from the laser beam L and DC noise signal components $I_N$ superposing on the normal signals, as shown in FIG. 6(a) which shows a graph having a horizontal axis representing time and a vertical axis showing signal output. Even if the rotating laser system is used indoors under the illumination of incandescent lamp or the like, normal signals are similarly superposed by DC noise signal components.

In order to overcome such a problem, the prior art photodetection device 1 comprises AC coupling circuits as composed of capacitor, which are connected with the light receiving elements 11 and 12, respectively. As shown in FIG. 6(b), the AC coupling circuits serves to remove DC noise signal components $I_N$ based on disturbance rays from the sun or incandescent lamp and to take only AC components $I_{sc}$ (hereinafter called "normal output signals") based on the normal signals $I_S$ from the laser beam L.

However, if any obstructive such as a person or motorcar moves across the optical path between the laser beam projecting device 2 and the photodetection device 1 during measurement or if the photodetection device 1 is rotated about its vertical axis during measurement or if the sun is blocked by cloud for a brief time, the amount of illumination rays entering the light receiving elements 11 and 12 from the sun or incandescent lamp will vary to have AC noise signal components $I_A$, as shown in FIG. 6(a).

The AC coupling circuits in the prior art photodetection device 1 cannot the AC noise signal components $I_A$. Therefore, AC noise signal components $I_{AC}$ will be provided to the photodectection device 1. As a result, the processing circuit will judge the AC noise signal components $I_{AC}$ as normal output signals $I_{SC}$, as shown in FIG. 6(b). This results in errors in operation and measurement.

The present invention is directed to provide a photodetection method and apparatus which can prevent any error in operation and measurement from being created from the influence of disturbance rays from a source of pulsed light such as fluorescent lamp or the like.

SUMMARY OF THE INVENTION

To this end, the first aspect of the present invention provides a photodetection method comprising first step of converting the amount of incident rays into an electrical signal; second step of taking out only AC signal components from said electrical signal; third step of holding the maximum signal level of said AC signal components for a predetermined sampling time period; fourth step of storing the signal value in the maximum signal level; fifth step of judging whether or not the stored signal value is present during said predetermined sampling time period; and sixth step of taking the stored signal value as a normal signal for the subsequent signal processing procedure if the row of results obtained at the fifth step is "absent", "present" and "absent", the stored signal value corresponding to the "present" result and also judging that said stored signal value is a noise signal resulting from disturbance if the row of results at the fifth step is not "absent", "present" and "absent", the noise signal being not taken for the subsequent signal processing procedure.

In the second aspect, the present invention provides a photodetection apparatus comprising light receiving means for converting the amount of incident rays into an electrical signal; AC coupling means for taking out only AC signal components from said electrical signal; peak holding means for holding the maximum signal level of said AC signal components for a predetermined sampling time period; first memory means for storing the signal value in the maximum signal level; first judgement means for judging whether or not the stored signal value is present during said predetermined sampling time period; second memory means for storing results in said first judgement means; and second judgement means for taking the stored signal value as a normal signal for the subsequent signal processing procedure if results judged at said first judgement means are "absent", "present", and "absent", the stored signal value corresponding to the "present" result and also judging that said stored signal value is a noise signal resulting from disturbance if the results are not "absent", "present" and "absent", the noise signal being not taken for the subsequent signal processing procedure.

In the third aspect, the present invention provides a photodetection apparatus wherein said first and second memory means are each composed of RAM and wherein said first and second judgement means are each composed of a microprocessor.

In the fourth aspect, the present invention provides a photodetection apparatus comprising at least two light receiving means each for receiving a beam of light turned about a vertical axis to form a reference plane and converting the received light beam into an electrical signal, said photodetection apparatus being adapted to measure the amount of incident rays in the light beam entering on said light receiving means and to generate an output signal representing the relative positional relationship between said light receiving means and said reference plane, the improvement being characterized by AC coupling means for taking out only AC signal components from said electrical signal; peak holding means for holding the maximum signal level of said AC signal components for a predetermined sampling time period; first memory means for storing the signal value in the maximum signal level; first judgement means for judging whether or not the stored signal value is present during said predetermined sampling time period; second memory means for storing results in said first judgement means; and second judgement means for taking the stored signal value as a normal signal for the subsequent signal processing procedure if results judged at said first judgement means are "absent", "present", and "absent", the stored signal value corresponding to the "present" result and also judging that said stored signal value is a noise signal resulting from disturbance if the results are not "absent", "present" and "absent", the noise signal being not taken for the subsequent signal processing procedure.

The inventors noticed that as seen from FIG. 6(b), the pulse width $P_A$ of the noise signals $I_{AC}$ from the disturbance rays is extremely larger than the pulse width $P_S$ of the normal output signal $I_{SC}$. The inventors selected a sampling time period for detection and processing of the output signals from the light receiving means such that it is sufficiently larger than the pulse width $P_S$ of the normal output signal $I_{SC}$ but very smaller than the pulse width $P_A$ of the noise signal $I_{AC}$. During each of such sampling time periods, it is judged whether an output signal from the light receiving means is "present" (hereinafter represented by "1" in binary digit) or "absent" (hereinafter represented by "0" in binary digit). If the row of results obtained by at least three successive sampling periods is "0-1-0", it will be judged that the output signal generated during a sampling time period in which the output signal from the light receiving means is "present" is a normal output signal $I_{SC}$. If output signals are "present" during two of at least three sampling time periods as shown by "0-1-1", "1-1-1", "1-1-0" or "1-0-1", it will be judged that these output signals are due to any disturbance rays. The noise signals will not be taken for the subsequent signal processing procedure. In such a manner, the present invention can eliminate any affection due to disturbance rays.

DETAILED DESCRIPTION OF THE PREFERRED EMBODIMENTS

The present invention will now be described by way of example in connection with the photodetection device of the rotating laser system.

Figure 1:
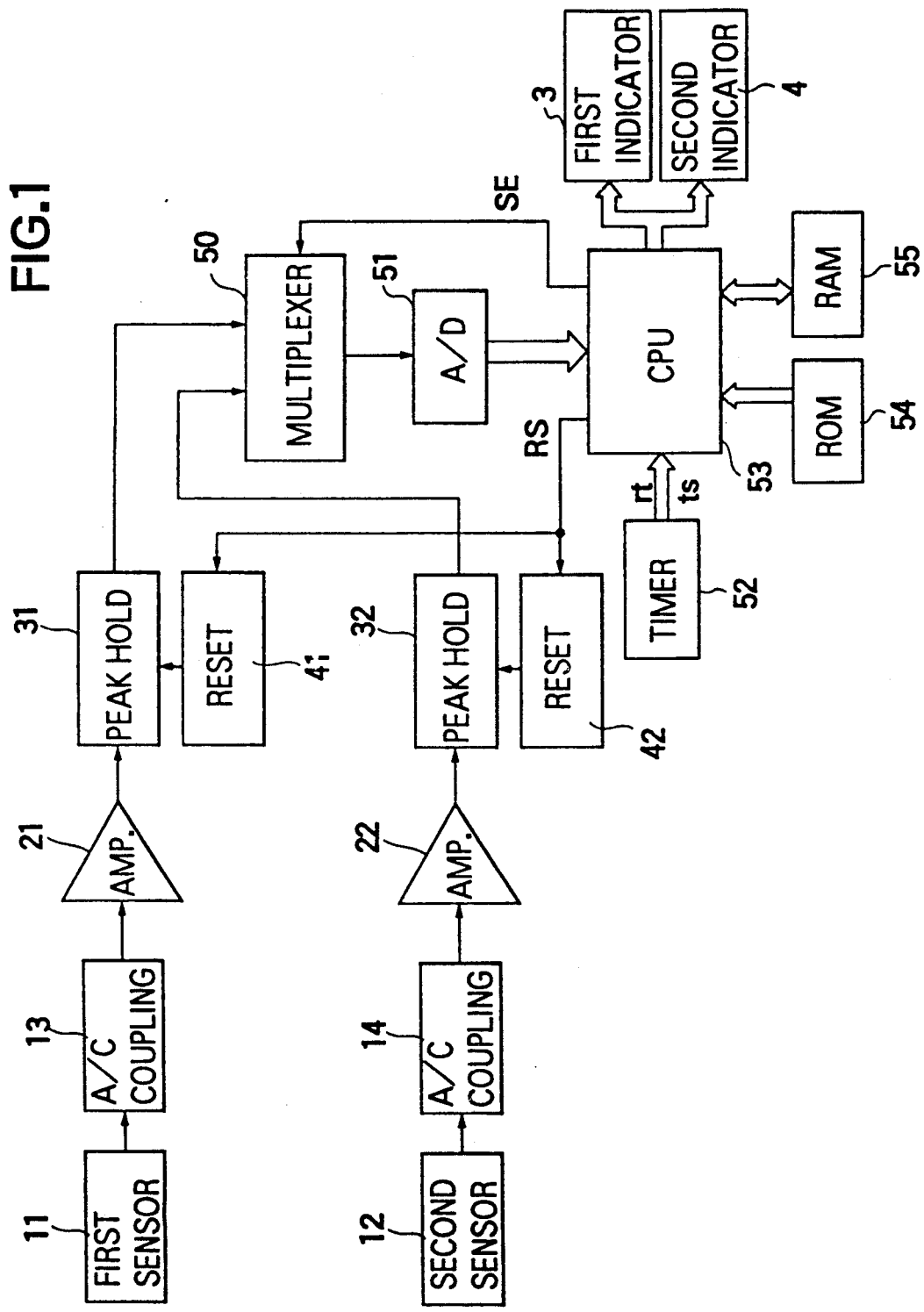
FIG. 1 is a block diagram of a circuitry in a photodetection apparatus constructed in accordance with the present invention.
Figures 4, 5:
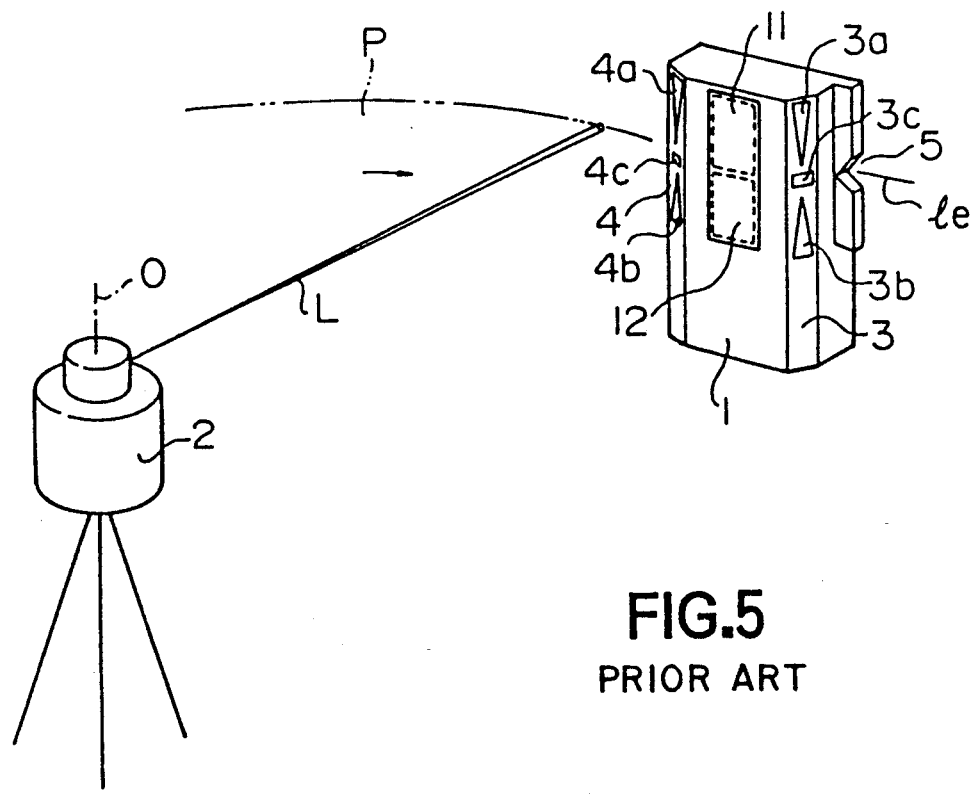
FIG. 4 is a table illustrating the contents of the RAM 55.
FIG. 5 is a perspective view of a rotating laser system which can utilize the prior art and the photodetection device of the present invention.
Figure 6A:
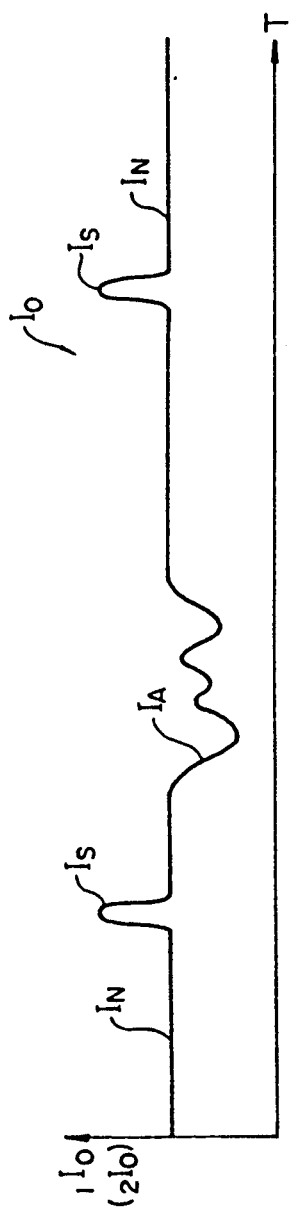
FIG. 6(a) is a time-signal output waveform illustrating a signal from a photosensor in the prior art photodetection device.
Figure 6B:
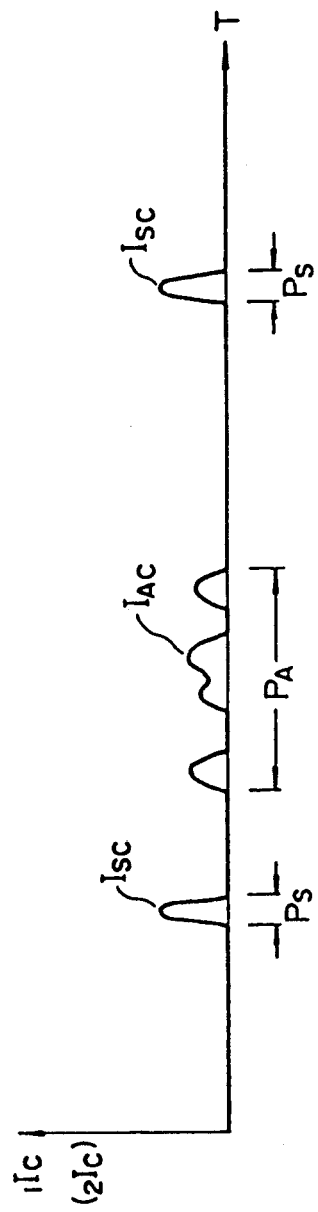
FIG. 6(b) is a time-signal output waveform illustrating an output signal from a AC coupling circuit in the prior art photodetection device.

Referring to FIG. 1, there is shown a circuit layout which can be used in a photodetection device constructed according to the present invention. The photodetection device 1 comprises first and second photosensors 11 and 12 each of which includes photodiode or the like. As shown in FIG. 5, the first and second photosensors 11 and 12 are located in the photodetection device 1 at its light receiving area and spaced vertically apart from each other. Each of these photosensors 11 and 12 is connected with an AC coupling circuit 13 or 14 which includes a capacitor or the like.

As seen from FIG. 2(a), signals $_1I_o$ from the first photosensor 11 include a combination of normal signals $_1I_S$ based on the laser beam L from a laser projecting device 2 in the rotating laser system with disturbance signals based on disturbance rays as from the sun or incandescent lamp, including AC noise components $_1I_A$ and DC noise components $_1I_N$. The AC coupling circuit 13 serves to remove DC noise components $_1I_N$ from the signals $_1I_S$ and to output a normal output signal $_1I_{SC}$ and AC noise output signals $_1I_{AC}$ resulting from the disturbance rays, as shown in FIG. 2(b).

Similarly, signals $_2I_o$ from the second photosensor 12 include a combination of normal signals $_2I_S$ based on the laser beam L with disturbance signals as based on the sun or incandescent lamp, including AC noise components $_2I_A$ and DC noise components $_2I_N$, as seen from FIG. 2(e). The AC coupling circuit 14 removes DC noise components $_2I_N$ from the signal $_2I_S$ and outputs a normal output signal $_2I_{SC}$ and AC noise output signals $_2I_{AC}$ resulting from the disturbance rays, as shown in FIG. 2(f).

The output signals from the AC coupling circuits 13 and 14 are amplified respectively by amplifiers 21 and 22 and inputted respectively into peak holding circuits 31 and 32. Each of the peak holding circuits 31 or 32 functions to hold the maximum value of the output signals from the corresponding one of the AC coupling circuits 13 and 14. One of the peak holding circuits 31 is connected with a reset circuit 41 while the other peak holding circuit 32 is connected with another reset circuit 42. When a reset signal R is inputted from each of the reset circuit 41 and 42 into the corresponding peak holding circuit 31 or 32, the maximum value held therein is once reset and the maximum of another output signal again begins to be held.

The peak holding circuits 31 and 32 are connected with a multiplexer circuit 50 which is adapted selectively to provide output signals ($_1I_{SC}$, $_1I_{AC}$), ($_2I_{SC}$, $_2I_{AC}$) from the peak holding circuits 31 and 32 to an A/D converting circuit 51 when received commands of selection signals SE from a microprocessor (CPU) 53 in a microcomputer. After the analog output signals have been converted into digital signals at the A/D converting circuit 51, these digital signals are inputted and processed in a microprocessor (CPU) 53 as will be described.

The CPU 53 is connected with a timer circuit 52 for determining a given sampling period and a given reset timing; a RAM 55 for storing data including output signals and others; a ROM 54 in which a processing program described hereinafter has been stored; and first and second indicators 3, 4 which have been described hereinbefore in connection with FIG. 5.

Prior to the description of the operation of the above-mentioned circuit, the sampling period and the read-out timing will be described in connection with FIG. 3.

The sampling period $\tau$ (see FIG. 2(i)) is preset for the detecting and processing operations of output signals and selected such that it is sufficiently larger than the pulse widths $_1P_S$ and $_2P_S$ of the normal output signals $_1I_{SC}$ and $_2I_{SC}$ but extremely smaller than the pulse widths $_1P_A$ and $_2P_A$ of the noise signals $_1I_{AC}$ and $_2I_{AC}$. In this embodiment, the sampling period is 10 microseconds. Within the sampling period $\tau$, a routine is set such that it is completed from "START" to "END" in the flow chart of FIG. 3.

The read-out timing (hold time) r means a holding period in each of the peak holding circuits 31 and 32 or a timing wherein a holding signal is outputted to the A/D converting circuit 51 through the multiplexer circuit 50. The length of the hold time is equal to about 5%–10% of said sampling period $\tau$ and similarly counted by the timer circuit 52.

Figure 3:
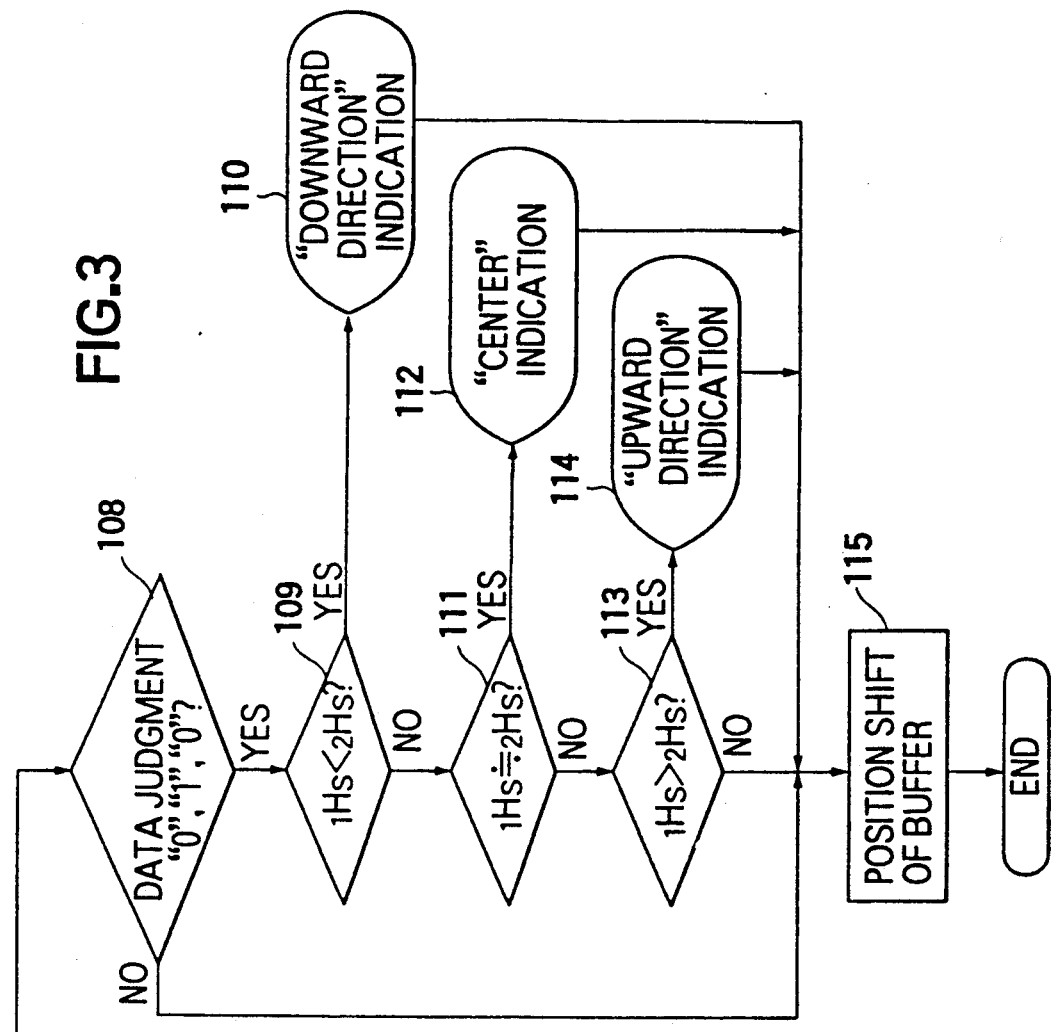
FIG. 3 is a flow chart illustrating the operation of a photodetection device constructed in accordance with the present invention.

The circuit will be operated according to the flow chart of FIG. 3.

Referring to FIGS. 2(c), (d), (g) and (h), the zero-th to fourth sampling periods and the twelfth and thirteenth sampling periods will be described sequentially.

(1) The zero-th sampling period (where no sensor signal is outputted from both the first and second photosensors 11 and 12):

Step 101

When the hold time has been counted by the timer circuit 52, a read-out timing signal rt is given to the CPU 53. The CPU 53 then outputs a selection signal SE to the multiplexer circuit 50 wherein the value of the maximum output signal ($_1H_S$, $_1N_{1-9}$) of the first photosensor 11 held by the peak holding circuit 31 from the start step to that step during the present sampling period is inputted into the A/D converting circuit 51. The A/D converting circuit 51 converts the analog output signal ($_1H_S$ or $_1N_{1-9}$) into a digital signal which is in turn stored in a buffer at an address 101 in the RAM 55, as schematically shown in FIG. 4. Since there is no output signal in the present zero-th sampling period, all the digits in the 101-th address become "0".

Step 102

Subsequently, the CPU 53 again outputs a selection signal SE to the multiplexer circuit 50 which in turn provides the maximum output signal ($_2H_S$ or $_2N_{1-9}$) of the second photosensor 12 from the peak holding circuit 32 during the present sampling period from the start to that time point to the A/D converting circuit 51. The A/D converting circuit 51 then converts the analog output signal ($_2H_S$ or $_2N_{1-9}$) into a digital signal which is in turn stored in the RAM 55 at an address buffer 201, as shown in FIG. 4. Since there is no output signal in the present zero-th sampling period, all the digits at the 102-th address become "0".

Step 103

CPU 53 judges whether the output signal now taken in from the peak holding circuit 31 or 32 by the RAM 55 is "present" or "absent". The judgement is performed that the output signal is "absent". The program proceeds a step 105.

Step 105

CPU 53 causes "0" to be stored at the least significant bit of the 103th address which is a data judging buffer in the RAM 55, as shown schematically in FIG. 4. The program then proceeds a step 108.

Step 108

CPU 53 judges whether or not the contents of the data judging buffer stored at its three lower bits are "0-1-0". Since there is no sampling period before the present zero-th sampling period, it will be judged that the contents of the data judging buffer is "0-0-0" or "absent ". The program proceeds a step 115.

Step 115

CPU 53 shifts the result "0" of the step 103 stored in the data adjusting buffer of the RAM 55 at its least significant bit to the adjacent higher order bit and renders the least significant bit to be writable.

As the timer circuit 52 has counted out the sampling time period $\tau$, CPU 53 receives its count signal ts to begin the detection-processing routine for the next or first sampling time period.

(2) First Sampling Period (where no signal is outputted from both the first and second photosensors 11 and 12):

During the zero-th sampling period, steps 101 to 103, 105, 108 and 115 will be executed.

If is judged that the contents of the data judging buffer of the RAM 55 stored at the step 108 are "0-0-0"

or "absent" since the previous zero-th sampling period and the present first sampling period are both "0".

(3) Second Sampling Period (a signal is outputted from one of the first and second photosensors 11 and 12):

Steps 101 and 102

Steps 101 and 102 in the zero-th sampling period will be executed. Since signals are outputted from the first and second photosensors, the respective maximum output signals $_1H_S$ and $_2H_S$ converted at the A/D converter 51 are stored, as binary digits, in the 101-th and 102-th address buffers of the RAM 55.

Step 103

CPU 53 judges whether a signal outputted from one of the peak holding circuits 31 and 32 and just now taken in at the sampling period, it is judged that the output signal is "present", and the program proceeds the next step 104.

Step 104

CPU 53 causes "1" to be stored the least significant bit of the 103-th address which is a data judging buffer in the RAM 55. The program proceeds the next step 106.

Step 106

CPU 53 outputs reset command signals RS to the reset circuits 41 and 42. After received the reset command signal RS, each of the reset circuits 41 and 42 provides a reset signal R to the output of the corresponding one of the peak holding circuits 31 and 32 so that the maximum value $_1H_S$ or $_2H_S$ of the output signal $_1I_{SC}$ or $_2I_{SC}$ held in the peak holding circuit 31 or 32 will be caused to be reset. After reset, each of the peak holding circuits 31 and 32 again begins to hold the maximum value of the output signal $_1I_{SC}$ or $_2I_{SC}$ from the amplifier 21 or 22.

Step 107

CPU 53 shifts output signal values $_1H_S$ and $_2H_S$ stored in the RAM 55 respectively at the 101-th and 102-th address buffers at the steps 101 and 102 to the other 201-th and 202-th address buffers of the RAM 55 which in turn store these output signal values.

Step 108

CPU 53 judges whether the contents of the data judging buffer stored at three higher bits from the least significant bit are "0-1-0" or "absent". In the present second sampling period, the stored contents are "0-0-1". This is judged to s be "absent". The program proceeds a step 115.

(4) Third Sampling Period (where no signal is outputted from both the first and second photosensors 11 and 12):

Step 108

CPU 53 judges whether the contents stored in the data judging buffer at three higher bits from the least significant bit are "0-1-0" or "absent". The contents now utilized herein define a row of results judged at step 103 during the first, second and third sampling periods. Since the result judged for the first sampling period is "0"; the result for the second sampling period is "1" and the result for the third sampling period is "0", the present step judges the stored contents are "0-1-0". The program proceeds a step 109.

Step 109

CPU 53 reads out, as normal signals, the output signal $_1H_S$ and $_2H_S$ which were obtained during the second sampling period and have been stored in the 201-th and 202-th address buffers of the RAM 55. It is judged herein whether or not one of the output signal $_1H_S$ is smaller than the other output signal $_2H_S$. In this embodiment, the output signal $_1H_S$ is larger than the other output signal $_2H_S$. It is thus judged that the result is "NO". The program proceeds a step 111.

If the result is "YES", it is discriminated that the reference mark 5 of the photodetection device is positioned above the reference plane P defined by the laser beam L. The program proceeds a step 110 wherein the "downward direction" indicators 3a and 4a are lighted on to indicate a direction in which the photodetection device is to be moved.

Step 111

It is judged that the output signal $_1H_S$ is equal to or approximates to the other output signal $_2H_S$ in a predetermined range.

Since the output signal $_1H_S$ is extremely larger than the output signal $_2H_S$ in this embodiment, the judgement is to be "NO". The program proceeds a step 113.

If the result of judgement is "YES", it is discriminated that the reference mark 5 of the photodetection device is aligned with the reference plane L defined by the laser beam L. The program then proceeds a step 112 wherein the "center" indicators 3c and 4c are lighted on to inform the operator that a levelling mark le should be drawn along the reference mark 5.

Step 113

It is judged whether or not the output signal $_1H_S$ is larger than the output signal $_2H_S$. In this embodiment, the result of judgement is "YES". This means that the reference mark 5 of the photodetection device is located below the reference plane P. The program then proceeds a step 113 wherein the "upward direction" indicators 3b and 4b are lighted on to indicate a direction in which the photodetection device is to be moved.

Step 115

CPU 53 shifts the result "0" judged at the step 103 and stored in the data judging buffer of RAM 55 at its least significant bit to the adjacent higher bit and renders the least significant bit to be writable. After the timer circuit 52 has counted out for the sampling period τ, CPU 53 receives a count signal ts and then begins a detection-processing routine for the next or fourth sampling period.

(5) Fourth Sampling Period (where a signal is outputted from at least one of the first and second photosensors 11 and 12):

Steps 101 through 104, 106 and 107 for the second sampling period will be executed.

However, output signals generated at these steps are noise output signal $_1N_4$ and $_2N_4$ from disturbance rays.

Step 108

CPU 53 judges whether the contents of the data judging buffer stored at its three higher bits from the least significant bit are "0-1-0" or "absent". Since the stored contents are "1-0-1" until the fourth sampling period, the judgement is to be "absent". The program then proceeds a step 115.

Even if the output signals $_1N_4$ and $_2N_4$ are stored in the 201-th and 202-th address buffers of RAM 55 at the step 107, these data will not be utilized for measurement.

The similar routine will be executed also for the fifth–eleventh sampling periods. In any event, it will be judged that the stored contents are "NO" at the step 103 or that the stored contents are "YES" at the step 103. At the subsequent step 107, noise output signals $_1N_5$ to $_1N_9$ and $_2N_5$, $_2N_8$ and $_2N_9$ are stored in the 201-th and 202-th address buffers of RAM 55 and waited for measurement. However, the contents of the data judging buffer at its three higher bits from the least significant bit become "0-0-1", "0-1-1", "1-1-1", "1-1-0", "1-0-0". In any event, the judgement at the step 108 becomes "NO". Thus, these noise output signals will not be utilized for the subsequent measurement steps starting a step 109. This can prevent erroneous measurement due to noise output signals.

Figure 2:
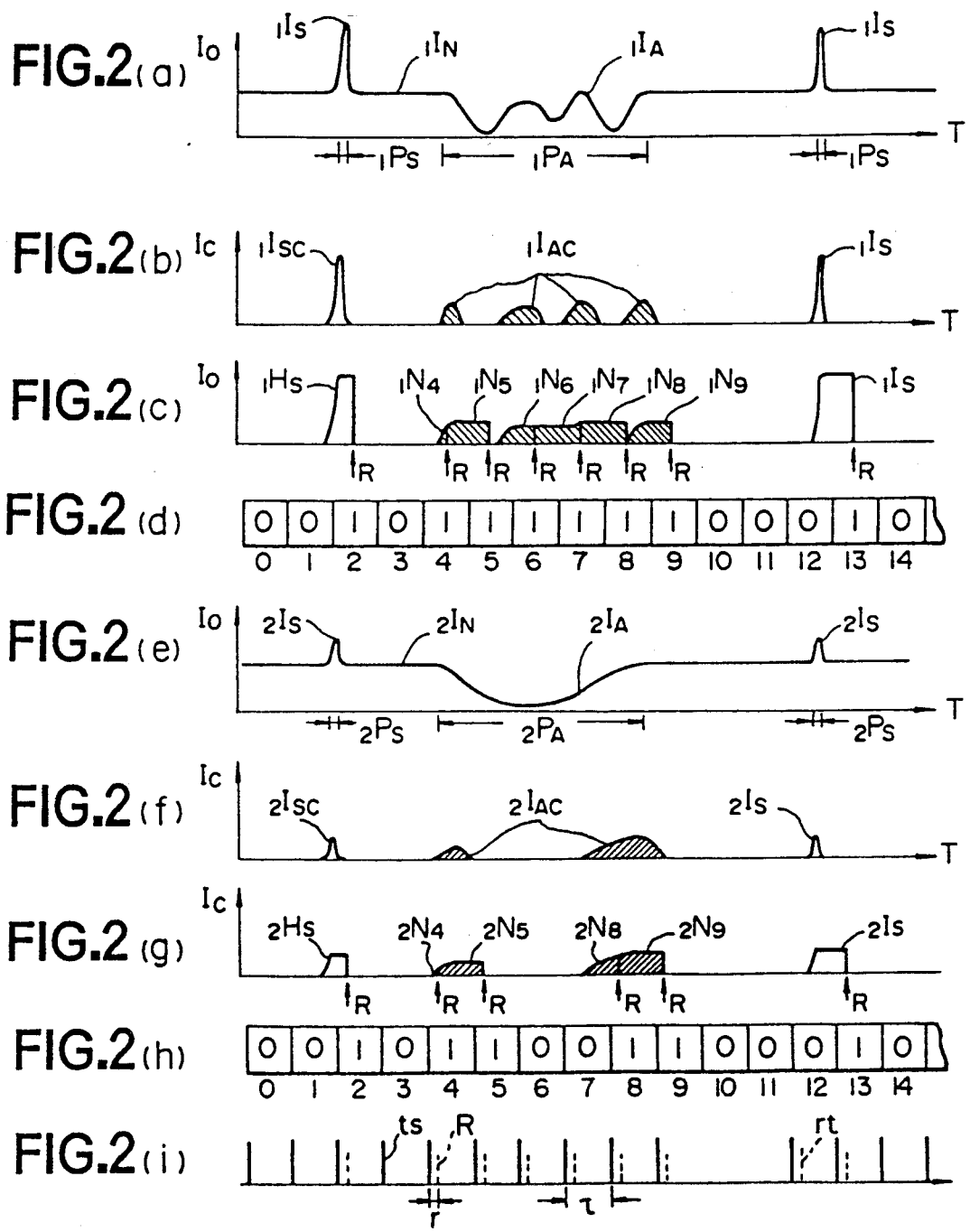
FIG. 2(a) is a time-signal output waveform illustrating a signal from the first photosensor 11.
FIG. 2(b) is a time-signal output waveform illustrating an output signal from the AC coupling circuit 13.
FIG. 2(c) is a time-signal output waveform illustrating an output signal from the peak holding circuit 31.
FIG. 2(d) is a schematic diagram of the row of sampling periods.
FIG. 2(e) is a time-signal output waveform illustrating a signal from the second photosensor 12.
FIG. 2(f) is a time-signal output waveform illustrating an output signal from the AC coupling circuit 14.
FIG. 2(g) is a time-signal output waveform illustrating an output signal from the peak holding circuit 32.
FIG. 2(h) is a schematic diagram showing the row of sampling periods.
FIG. 2(i) is a timing chart illustrating the relationship between sampling periods $\tau$, reset signals R and readout timing r.

(6) Twelfth Sampling Period (where a signal is outputted from at least one of the first and second photosensors 11 and 12 after the read-out timing):

In the twelfth sampling period, the first and second photosensors 11 and 12 generate output signals, as shown in FIG. 2. This signals begin to be outputted after the read-out timing signal r from the timer circuit. During the twelfth sampling period, therefore, steps similar to those executed during the aforementioned zero-th sampling period will be executed. However, output signals $_1I_{SC}$ and $_2I_{SC}$ continue to be inputted from the amplifiers 21 and 22 into the peak holding circuits 31 and 32. Thus, the peak holding circuits 31 and 32 hold the maximum output signals $_1H_S$ and $_2H_S$ thereof.

(7) Thirteenth Sampling Period (where no signal is outputted from both the first and second photosensors 11 and 12 and a signal obtained during the previous sampling period is held):

During the thirteenth sampling period, no signal is outputted from the first and second photosensors 11 and 12, as shown in FIG. 2. However, the maximum output signals $_1H_S$ and $_2H_S$ outputted from the photosensors 11 and 12 after an read-out signal r has been outputted during the previous twelfth sampling period are held by the peak holding circuits 31 and 32. Therefore, steps similar to those in the aforementioned second sampling period will be executed.

Finally, the same steps as in the third sampling period will be executed to measure output signals $_1H_S$ and $_2H_S$ during the fifth sampling period.

I claim:

1. A photodetection method, comprising the steps of:
   1) converting incident rays into an electrical signal;
   2) separating AC signal components from the electrical signal;
   3) holding a maximum signal level of the AC signal components, if an AC signal component appears during a predetermined sampling period;
   4) storing the held maximum signal level associated with the predetermined sampling period, if a maximum signal level is held in the holding step;
   5) determining whether or not a maximum signal level has been stored during each of a sequential plurality of the predetermined sample periods; and
   6) either:
      a) taking the stored maximum value signal from the storing step as a detection signal, for further processing; or
      b) disregarding, as a noise signal, the maximum value stored in the storing step, so that the noise signal does not deteriorate the further processing;
   step 6 constituting step a) or step b), depending on whether or not, during three consecutive sampling periods A, B and C:
      A) a maximum value is not stored in the storing step associated with sampling period A due to an AC signal component not appearing therein;
      B) a maximum value is stored in the storing step associated with sampling period B due to an AC signal component appearing therein; and
      C) a maximum value is not stored in the storing step associated with sampling period C due to an AC signal component not appearing therein.

2. A photodetection apparatus, comprising:
   1) means for converting incident rays into an electrical signal;
   2) means for separating AC signal components from the electrical signal;
   3) means for holding a maximum signal level of the AC signal components, if an AC signal component appears during a predetermined sampling period;
   4) means for storing the held maximum signal level associated with the predetermined sampling period, if a maximum signal level is held by the holding means;
   5) means for determining whether or not a maximum signal level has been stored during each of a sequential plurality of the predetermined sample periods; and
   6) means for judging whether to:
      a) take the stored maximum value signal from the storing means as a detection signal, for further processing; or
      b) disregard, as a noise signal, the maximum value stored in the storing means, so that the noise signal does not deteriorate the further processing;
   wherein the judging means judges whether to perform a) or b), depending on whether or not, during three consecutive sampling periods A, B and C:
      A) a maximum value is not stored by the storing means in association with sampling period A due to an AC signal component not appearing therein;
      B) a maximum value is stored by the storing means in association with sampling period B due to an AC signal component appearing therein; and
      C) a maximum value is not stored by the storing means in association with sampling period C due to an AC signal component not appearing therein.

3. The apparatus of claim 2, wherein:
   the means for storing includes a random access memory (RAM); and
   the means for determining and the means for judging include a microprocessor.

4. A photodetection apparatus, comprising:
   1) at least two light receiving means, each light receiving means oriented for receiving incident rays of light that are turned about a vertical axis to form a reference plane;
   2) means for converting the incident rays into an electrical signal;
   3) means for separating AC signal components from the electrical signal;
   4) means for holding a maximum signal level of the AC signal components, if an AC signal component appears during a predetermined sampling period;
   5) means for storing the held maximum signal level associated with the predetermined sampling period, if a maximum signal level is held by the holding means;
   6) means for determining whether or not a maximum signal level has been stored during each of a sequential plurality of the predetermined sample periods; and
   7) means for judging whether to:

a) take the stored maximum value signal from the storing means as a detection signal, for further processing; or
b) disregard, as a noise signal, the maximum value stored in the storing means, so that the noise signal does not deteriorate the further processing;

wherein the judging means judges whether to perform a) or b), depending on whether or not, during three consecutive sampling periods A, B and C:

A) a maximum value is not stored by the storing means in association with sampling period A due to an AC signal component not appearing therein;

B) a maximum value is stored by the storing means in association with sampling period B due to an AC signal component appearing therein; and C) a maximum value is not stored by the storing means in association with sampling period C due to an AC signal component not appearing therein;

8) means for measuring respective amounts of incident rays received by the at least two light receiving means; and 9) means for generating an output signal that represents a relative position of the at least two light receiving means and the reference plane, the output signal not being affected by stored maximum values that are disregarded in accordance with the judging means.

* * * * *